United States Patent
Chen et al.

(10) Patent No.: US 12,225,076 B2
(45) Date of Patent: Feb. 11, 2025

(54) METHOD AND APPARATUS FOR COMPUTING NETWORK EDGE, DEVICE, AND MEDIUM

(71) Applicant: GUIZHOU BAISHANCLOUD TECHNOLOGY CO., LTD., Guiyang (CN)

(72) Inventors: Chuang Chen, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 408 days.

(21) Appl. No.: 17/761,707

(22) PCT Filed: Aug. 26, 2020

(86) PCT No.: PCT/CN2020/111469
§ 371 (c)(1),
(2) Date: Mar. 18, 2022

(87) PCT Pub. No.: WO2021/052132
PCT Pub. Date: Mar. 25, 2021

(65) Prior Publication Data
US 2022/0394084 A1    Dec. 8, 2022

(30) Foreign Application Priority Data
Sep. 19, 2019 (CN) .......................... 201910885903.5

(51) Int. Cl.
H04L 67/1004 (2022.01)
H04L 45/74 (2022.01)
H04L 67/60 (2022.01)

(52) U.S. Cl.
CPC .......... *H04L 67/1004* (2013.01); *H04L 45/74* (2013.01); *H04L 67/60* (2022.05)

(58) Field of Classification Search
None
See application file for complete search history.

(56) References Cited

U.S. PATENT DOCUMENTS

2008/0151893 A1    6/2008   Nordmark et al.
2014/0108661 A1    4/2014   Tang et al.
(Continued)

FOREIGN PATENT DOCUMENTS

CN    101699801 A    4/2010
CN    105847108 A    8/2016
(Continued)

OTHER PUBLICATIONS

Intellectual Property Office of Singapore Search Report and Written Opinion for Application No. 11202202721V Mar. 1, 2024 12 pages.
(Continued)

*Primary Examiner* — Diane L Lo
(74) *Attorney, Agent, or Firm* — ANOVA LAW GROUP, PLLC

(57) ABSTRACT

A network edge computing method includes receiving, by an edge data node, a service request; and routing, by the edge data node and according to a virtual IP address and port information in the service request, the service request to one or more containers corresponding to a service, to be processed by the one or more containers.

17 Claims, 5 Drawing Sheets

(56) References Cited

U.S. PATENT DOCUMENTS

| | | | |
|---|---|---|---|
| 2015/0113154 A1 | 4/2015 | Nguyen et al. | |
| 2016/0094453 A1 | 3/2016 | Jain et al. | |
| 2016/0380916 A1 | 12/2016 | Gnaneswaran et al. | |
| 2017/0214550 A1* | 7/2017 | Kumar | H04L 41/5045 |
| 2018/0189114 A1* | 7/2018 | Jiang | G06F 9/4843 |
| 2019/0123970 A1 | 4/2019 | Rastogi et al. | |
| 2019/0243438 A1 | 8/2019 | Park et al. | |
| 2020/0036638 A1* | 1/2020 | Li | H04L 47/125 |
| 2020/0328977 A1* | 10/2020 | Pfister | H04L 67/5681 |
| 2021/0352042 A1 | 11/2021 | You et al. | |

FOREIGN PATENT DOCUMENTS

| | | |
|---|---|---|
| CN | 106020930 A | 10/2016 |
| CN | 108737468 A | 11/2018 |
| CN | 108833163 A | 11/2018 |
| CN | 108958927 A | 12/2018 |
| CN | 109067890 A | 12/2018 |
| CN | 109640319 A | 4/2019 |
| CN | 109725949 A | 5/2019 |
| CN | 109802934 A | 5/2019 |
| CN | 110198363 A | 9/2019 |
| CN | 110224860 A | 9/2019 |

OTHER PUBLICATIONS

The State Intellectual Property Office of People's Republic of China The First Office Action for CN 201910927436.8 Jul. 25, 2022 22 pages (with translation).
The State Intellectual Property Office of People's Republic of China The Second Office Action for CN 201910885903.5 Mar. 1, 2022 14 pages (with translation).
The World Intellectual Property Organization (WIPO) International Search Report for PCT /CN2020/111469 Nov. 26, 2020 7 Pages.
The State Intellectual Property Office of People's Republic of China The First Office Action for CN 201910885903.5 Aug. 2, 2021 15 pages (with translation).
The State Intellectual Property Office of People's Republic of China The Second Office Action for CN 201910885903.5 Mar. 1, 2022 10 pages (with translation).
CMCC. "Use Case of Edge Computing and Radio Network Exposure", 3GPP TSG RAN WG3 #101BIS r3-186040, Oct. 12, 2018.
Intellectual Property Office of Singapore Written Opinion for Application No. 11202202721V Nov. 5, 2024 9 pages.

* cited by examiner

METHOD AND APPARATUS FOR COMPUTING NETWORK EDGE, DEVICE, AND MEDIUM

CROSS-REFERENCE TO RELATED APPLICATIONS

The present application is a national stage entry under 35 U.S.C. § 371 of International Application No. PCT/CN2020/111469, filed on Aug. 26, 2020, which claims priority to Chinese Patent Application No. 201910885903.5, titled "METHOD AND APPARATUS FOR COMPUTING NETWORK EDGE, DEVICE, AND MEDIUM," filed to the State Intellectual Property Office of People's Republic of China on Sep. 19, 2019, which are incorporated herein by reference in their entirety.

TECHNICAL FIELD

The present application relates to, but is not limited to, an edge computing technology, and in particular to a method and an apparatus for computing a network edge, a device, and a medium.

BACKGROUND

Using the edge computing technology in a distributed content delivery network can realize most user data operations and data control sinking to the local device closest to the user without relying on the cloud, and it undoubtedly greatly improves the efficiency of data processing and reduces the load of the cloud and the central database. However, new problems have arisen. There are a large number of node servers in a distributed content delivery network, resulting in a variety of single or integrated services such as caching, scheduling, computing, monitoring, and storage. Then, how to provide edge computing services quickly and efficiently in large-scale complex server clusters has become a key issue.

SUMMARY

In order to overcome the problems in related technologies, the present application provides a method and an apparatus for computing a network edge and a medium for TCP services.

According to a first aspect of the present application, a method for computing a network edge is provided, comprising:
  receiving, by an edge data node, a service request; and
  routing, by the edge data node and according to a virtual IP address and port information in the service request, the service request to one or more containers corresponding to a service, to be processed by the one or more containers.

In the method, the routing, according to a virtual IP address and port information in the service request, the service request to one or more containers corresponding to a service comprises:
  querying a mapping relationship among public ports, virtual IP addresses, and port information corresponding to services of the edge data node to search for a public port corresponding to the virtual IP address and port information in the service request, and sending the service request to the public port located; and
  after receiving the service request, routing, by the public port and according to a load balancing mechanism, the service request to the one or more containers corresponding to the service.

The method further comprises:
  transmitting the virtual IP address and port information to an initiator of the service request in advance; or
  transmitting the virtual IP address and port information to a third party in advance, wherein the third party comprises at least a third party trusted by the initiator of the service request.

In the method, the edge data node is one or more edge data nodes in an edge data node cluster corresponding to the virtual IP address and port information; or
  the edge data node is one or more edge data nodes in an edge data node cluster selected based on a load balancing strategy and corresponding to the virtual IP address and port information.

In the method, the service request comprises a TCP request and/or a UDP request.

In the method, before the receiving, by an edge data node, a service request, the method further comprises:
  receiving, by the edge data node, a service create request, the service create request comprising at least container configuration information of the service to be created; and
  creating, by the edge data node and according to the container configuration information, containers corresponding to the service on servers in the edge data node.

In the method, the container configuration information comprises at least any one or more of:
  the number of containers, container-use resource information, or a container image address.

In the method, the creating, by the edge data node and according to the container configuration information, containers corresponding to the service on servers in the edge data node comprises:
  selecting, by the edge data node and according to the container-use resource information, a plurality of servers whose available resources meet the container-use resource information, and creating the containers corresponding to the service on the servers selected according to the container image address.

The method further comprises:
  configuring, by the edge data node, a corresponding public port for each of the containers created respectively by using a public port pre-configured and corresponding to the virtual IP address and port information of the service;
  wherein the virtual IP address and port information of the service pre-configured and the public port corresponding to the virtual IP address and port information are issued by a management center to the edge data node, or autonomously configured by the edge data node.

According to another aspect of the present application, an apparatus for computing a network edge is provided, comprising:
  a first module, configured to receive a service request; and
  a second module, configured to route, according to a virtual IP address and port information in the service request, the service request to one or more containers corresponding to a service, to be processed by the one or more containers.

In the apparatus, the second module, configured to route, according to a virtual IP address and port information in the service request, the service request to one or more containers corresponding to a service comprises:

querying, according to the virtual IP address and port information in the service request, a mapping relationship among public ports, virtual IP addresses, and port information corresponding to services of the apparatus, to search for a public port corresponding to the virtual IP address and port information in the service request, and sending the service request to the public port located; and after receiving the service request at the public port of any server in the apparatus, routing, according to a cluster load balancing mechanism, the service request to the one or more containers corresponding to the service.

The apparatus further comprises:

a third module, configured to receive a service create request, the service create request comprising at least container configuration information of the service to be created, and create, according to the container configuration information, containers corresponding to the service on servers in the apparatus.

In the apparatus, the container configuration information comprises at least any one or more of:

the number of containers, container-use resource information, or a container image address.

In the apparatus, the third module, configured to create, according to the container configuration information, containers corresponding to the service on servers in the apparatus comprises:

selecting, according to the container-use resource information, a plurality of servers whose available resources meet the container-use resource information, and creating the containers corresponding to the service on the servers selected according to the container image address.

In the apparatus, the third module is further configured to configure a corresponding public port for each of the containers created respectively by using a public port pre-configured and corresponding to the virtual IP address and port information of the service;

wherein the public port pre-configured corresponding to the virtual IP address and port information of the service is issued by a management center to the apparatus, or autonomously configured by the apparatus.

In the apparatus, the service request comprises a TCP request and/or a UDP request.

According to still another aspect of the present application, there is provided a computer-readable storage medium comprising a computer program stored therein, when executed, the computer program implements the method and the system for computing a network edge as described above.

According to yet another aspect of the present application, a computer device is provided, comprising a processor, a memory, and a computer program stored in the memory, when executing the computer program, the processor implements the method and the system for computing a network edge as described above.

In the method and the apparatus for computing a network edge, the device, and the medium according to the present application, no intervention of the service provider is required, and the user can directly initiate a service request to the edge data node by using the virtual IP address and port information obtained in advance to realize the service for computing an edge.

It should be understood that, the aforementioned general description and detailed description hereinafter are merely exemplary and explanatory, and the present application is not limited thereto.

BRIEF DESCRIPTION OF THE DRAWINGS

The accompanying drawings illustrated herein, which constitute part of the present application, are used to provide further understanding of the present application, and exemplary embodiments of the present application and the description thereof are used to explain the present application and not intended to inappropriately limit the present application. In the drawings.

DETAILED DESCRIPTION

The technical solutions in the embodiments of the present application will be described clearly and completely with reference to the accompanying drawings in the embodiments of the present application. Apparently, the embodiments to be described are some embodiments of the present application, rather than all embodiments of the present application. Based on the embodiments of the present application, all other embodiments obtained by a person of ordinary skill in the art without paying any creative effort are included in the protection scope of the present application. It is to be noted that the embodiments of the present application and features in the embodiments may be combined if not conflict.

Embodiment 1

Figure 1:
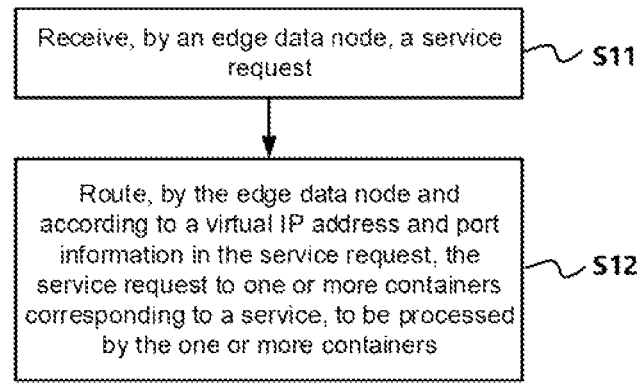
FIG. 1 is a schematic flowchart of a method for computing a network edge according to an exemplary embodiment.

This embodiment provides a method for computing a network edge. The implementation process of the method is shown in FIG. 1, and comprises:

Step S11: An edge data node receives a service request.

The service request mentioned in the present application may comprise any one or both of a TCP request or a UDP request.

Step S12: The edge data node routes, according to virtual IP address and port information in the service request, the service request to one or more containers corresponding to a service, to be processed by the one or more containers.

The virtual IP address in the service request may be a virtual IP address corresponding to the service. The port information may comprise information corresponding to the service, such as a port number or a port identifier.

The containers corresponding to the service comprise containers having been deployed on the edge data node to provide the service processing function. The containers may be deployed on one or more of servers of the edge data node.

The step S12 may be divided into:

Step S12a: Query a mapping relationship among public ports, virtual IP addresses, and port information corresponding to the services of the edge data node to search for a public port corresponding to the virtual IP address and port information in the service request received, and send the service request received to the public port located.

Step S12b: After receiving the service request, the public port routes the service request, according to a load balancing mechanism, to the one or more containers corresponding to the service. Generally, the service request is routed to one or more containers deployed on a server with light load.

In this embodiment, the edge data node that performs the operations may be one or more edge data nodes in an edge data node cluster corresponding to the virtual IP address and port information; or the edge data node may be one or more edge data nodes in an edge data node cluster selected based on a load balancing strategy and corresponding to the virtual IP address and port information.

It may be known from the above description that, in the technical solutions of this embodiment, no intervention of the service provider is required, and the user can directly initiate a service request to the edge data node by using the virtual IP address and port information obtained in advance to realize computing the edge of the service.

In addition, based on the above method, the edge data node may further perform:

the edge data node may transmit the virtual IP address and port information to the initiator of the service request in advance. In this way, the initiator of the service request may initiate a service request to the edge data node according to the virtual IP address and port information received.

The edge data node may further transmit the virtual IP address and port information to a third party in advance, wherein the third party includes at least a third party trusted by the initiator of the service request. In this way, the initiator of the service request may obtain the virtual IP address and port information through a third party. Thus, the initiator of the service request initiates a service request to the edge data node according to the virtual IP address and port information acquired.

It may be known from the above description that the edge data node may process the service request correspondingly because containers corresponding to the service have been already deployed in the edge data node. Therefore, on the basis of the above operations, the above method may further comprise an operation of creating containers corresponding to the service, specifically:

Step a: The edge data node receives a service create request, the service create request comprising at least container configuration information of the service to be created.

In the present application, the container configuration information may comprise any one or more of the number of containers, the container-use resource information, or the container image address.

Step b: The edge data node creates, according to the container configuration information, containers corresponding to the service on servers in the edge data node.

For example, the edge data node may select, according to the container-use resource information, a plurality of servers whose available resources meet the container-use resource information, and create containers corresponding to the service on the servers selected according to the container image address. Since one or more containers may be created on one server in the edge data node, the number of servers selected is less than or equal to the number of containers.

In addition, when creating containers corresponding to a service, the edge data node may configure a corresponding public port for each container created respectively by using a public port pre-configured and corresponding to the virtual IP address and port information of the service. The virtual IP address and port information of the service pre-configured and the public port corresponding to the virtual IP address and port information are issued by a management center to the edge data node, or autonomously configured by the edge data node.

Embodiment 2

This embodiment provides an apparatus for computing a network edge, mainly comprising a first module and a second module.

The first module is configured to receive a service request.

The service request received in the present application may comprise any one or both of a TCP request or a UDP request.

The second module is configured to route, according to a virtual IP address and port information in the service request, the service request to one or more containers corresponding to a service, to be processed by the one or more containers.

Specifically, the second module may query, according to virtual IP address and port information in the service request received, a mapping relationship among public ports, virtual IP addresses, and port information corresponding to the services of the apparatus, to search for a public port corresponding to the virtual IP address and port information in the service request received, and send the service request to the public port located; and When receiving the service request at the public port of any server in the apparatus, the service request may be routed to one or more containers corresponding to the service according to a cluster load balancing mechanism.

In addition, the apparatus may further comprise a function of creating containers corresponding to the service. In this case, a third module may be added. The third module receives the service create request, and obtains the container configuration information of the service to be created according to the service deploy request.

In this embodiment, the container configuration information of the service of computing the edge comprises at least one or more of the number of containers, the container-use resource information, or the container image address.

Specifically, as the method for creating containers, a plurality of servers whose available resources meet the container-use resource information may be selected according to the container-use resource information, and containers corresponding to the service are created on the servers selected according to the container image address. One or more containers may be created on one server, therefore, the total number of servers selected is less than or equal to the number of containers.

The third module may be further configured to configure a corresponding public port for each container created respectively by using a public port pre-configured and corresponding to the virtual IP address and port information of the service. The public port pre-configured and corresponding to the virtual IP address and port information of the service may be issued by a management center to the apparatus, or autonomously configured by the apparatus.

It may be known from the above description that, as long as the service request contains the virtual IP address and port information of the service, that is, the port accessed by the user (for example, when the service request initiated is a TCP request, the port accessed by the user comprises a TCP port; and when the service request initiated is a UDP request, the port accessed by the user comprises a UDP port), one user may be uniquely identified. The edge data node routes the user's service request to one or more relatively idle containers for processing, which greatly improves the user's service experience.

Embodiment 3

Figure 2:
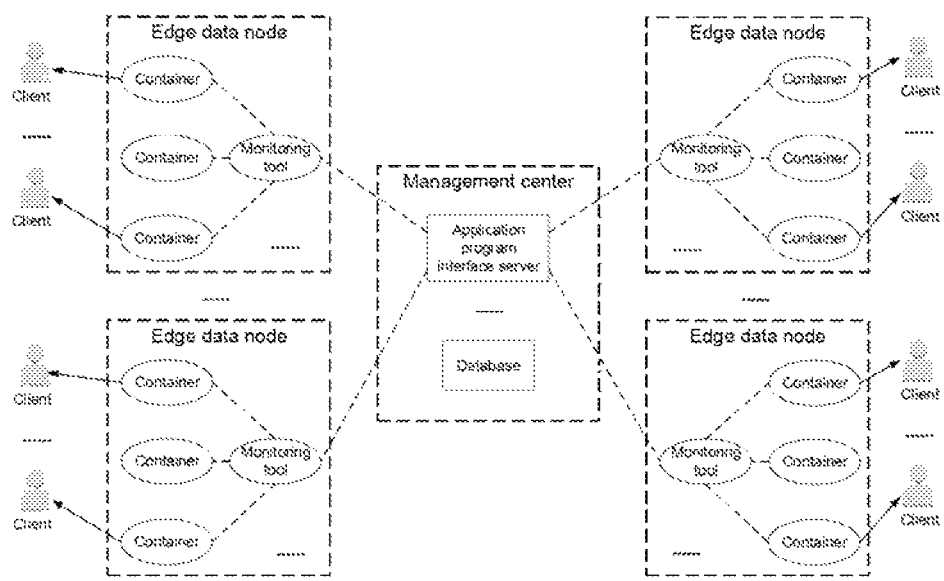
FIG. 2 is a schematic diagram of a network architecture for implementing computing an edge according to an exemplary embodiment.

In this embodiment, a network architecture of computing an edge of FIG. 2 is taken as an example to introduce the implementation of embodiment 1 and embodiment 2 above. It may be known from FIG. 2 that the overall architecture for implementing computing edge comprises at least two parts: a management center and edge data nodes.

The management center is configured to control and manage all edge data nodes, send create and manage commands to each edge data node, and collect information reported by each edge data node.

The edge data nodes are configured to process requests from users. Each node may be considered as a self-managed cluster, may perform load balancing processing on the requests received from users, and horizontally expand and automatically migrate the containers of this edge data node, thereby providing high availability.

The containers involved in the present application may comprise, but are not limited to, docker containers.

Figure 3:
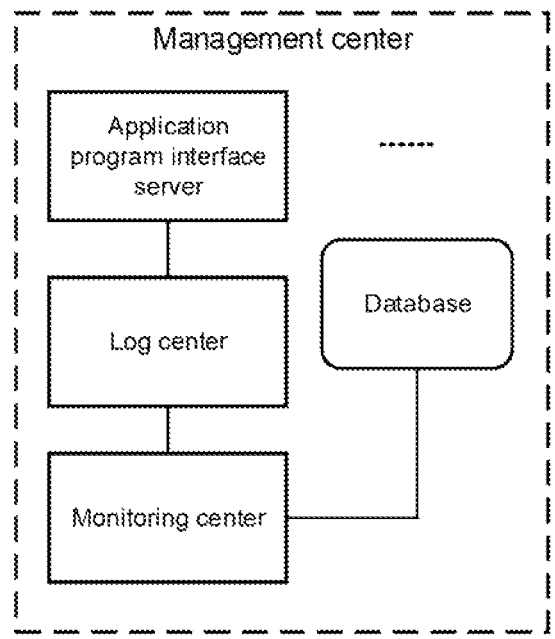
FIG. 3 is a schematic structural diagram of a management center in the network architecture of FIG. 2.

In the network architecture of FIG. 2, the management center is shown in FIG. 3 and may comprise:

Application program interface server: mainly configured to receive a service deploy request to edge data nodes, and determine to create a corresponding container on a specified node according to the configuration information involved in the service deploy request received and the server information of each node stored in the database, and send a corresponding operation command to a cluster management module of the edge data node, the operation command instructing the cluster management module of the edge data node to perform any one or more of operations such as creation, destruction, capacity expansion, or migration of local containers.

Specifically, the management center may send a service create request to a specified edge data node according to the configuration information of the service, wherein the service create request comprises container configuration information of the container deployed on the specified edge data node. When sending a service create request to a specified edge data node, the virtual IP address and port information of the service to be created and the corresponding public port may be configured, and the virtual IP address and port information of the service and the corresponding public port configured may be issued to the edge data node.

In addition, the management center may further return the virtual IP address and port information of the service configured to the initiator of the service deploy request, to indicate that the user using the service may use the virtual IP address and port information of the service to initiate a service request. In the present application, the initiator of the service deploy request may comprise the service provider. There may be many ways to return the virtual IP address and port information of the service configured. For example, the virtual IP address and port information of the service may be returned to the initiator of the service deploy request after the operation of configuring the virtual IP address and port information of the TCP service is completed. Also, the virtual IP address and port information of the service may be returned to the initiator of the service deploy request when a response to the service create request returned by the edge data node is received and it is confirmed according to the response that the edge data node has successfully created the service. When returning the virtual IP address and port information of the service, the virtual IP address and port information of the service may be directly or indirectly returned to the initiator of the service deploy request. When indirectly sending the virtual IP address and port information of the service, the virtual IP address and port information of the service may be sent to a third party specified by the initiator of the service deploy request. Then, the third party may interact with the initiator of the service deploy request to transmit the virtual IP address and port information of the service.

Log center: configured to collect log data from users, process and store the log data so that the users can view the log data in the future, analyze the user logs, mine abnormal data, and give a warning to a special log.

Monitoring center: configured to send a monitoring request to a cluster monitoring tool of an edge data node, the monitoring request may be used to collect the container state information and server state information in the cluster of the edge data node. Wherein, the monitoring request may be sent periodically to the cluster monitoring tool of each edge data node. The container state information may comprise the occupancy ratio of the container (for example, usage of the container memory, CPU, and network). The server state information may comprise the running load state of the server, etc.

Database: mainly configured to store user information, cluster information, server information on edge data nodes, etc. The user information comprises at least the user identification (for example, user IP, etc.). The cluster information comprises at least the state of the cluster, the number of tasks running in the cluster, etc. The server information on edge data nodes comprises at least the server identification, server load state, etc.

The database may further be configured to save the configuration information of a service after the service is created on the edge data node.

Figure 4:
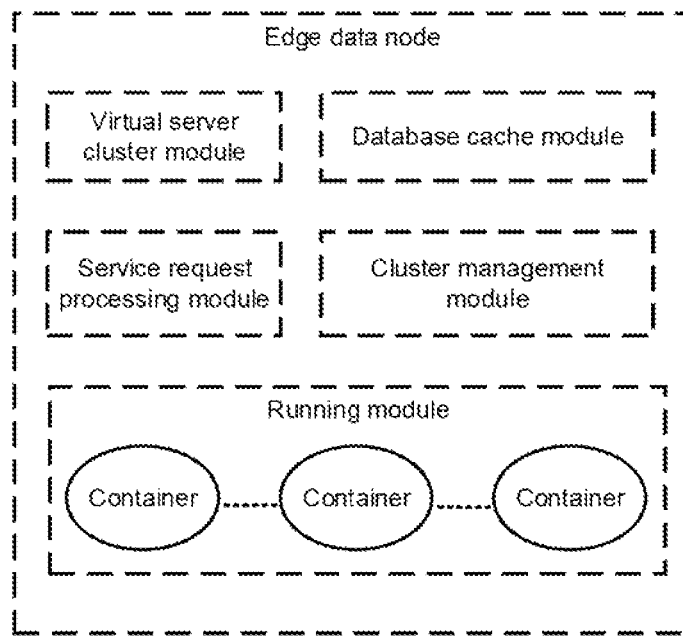
FIG. 4 is a schematic structural diagram of an edge data node in the network architecture of FIG. 2.

In the network architecture of FIG. 2, the edge data node is equivalent to an apparatus for computing a network edge described in embodiment 2. In this embodiment, the edge data node may comprise the following components, as shown in FIG. 4. The cluster management module, the database cache module, the virtual server cluster module, and the service request processing module all adopt redundant design to avoid the single point of failure.

Figure 5:
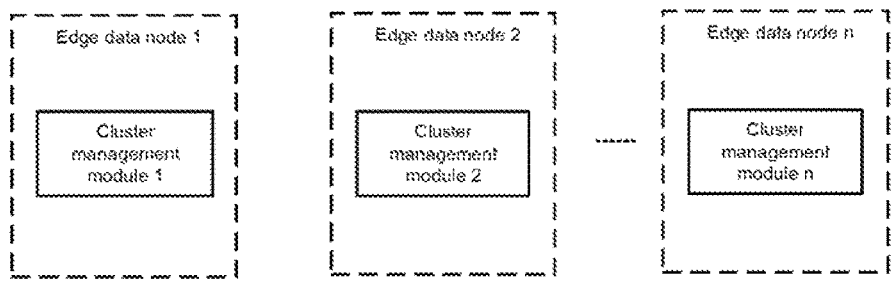
FIG. 5 is a schematic principle diagram of cluster management among multiple nodes in the network architecture of FIG. 2.

Cluster management module (integrates the first module and the third module in embodiment 2): which is responsible for the creation, deletion, and migration of containers in the node according to the operation command issued by the management center, manages servers in the node, and collects the server state information in this node and reports it to the management center. In the present application, the cluster management modules for different nodes may be independent of each other, and each node is a self-managed cluster, as shown in FIG. 5. In this way, finer control granularity is ensured, and there is no need to maintain complex relationships through tags. For example, the container in each node is managed by only the cluster management module in the node, so there is no need to store the correspondence between the node and the container. Similarly, the node server in each node is managed by only the cluster management module in the node, and there is no need to mark and store the association between the node and the node server. Of course, a self-managed cluster may be formed by multiple nodes.

The method of constructing a cluster in a unit of a node so that the cluster management modules for different nodes are not related to each other can further detect the survival state of containers and servers more accurately. This is because all computer rooms use one cluster. After the cluster management module is deployed in the central node, the network environments from the central node to the edge computer rooms vary. It is very possible to misjudge the survival state of containers and nodes, leading to wrong migration. Limiting the cluster system to one node for management also has the beneficial effect: since, after a server is associated with a public port, all servers need to listen to the public port, unnecessary nodes are prevented from listening to the server at the public port after constructing different clusters according to different nodes.

Figure 6:
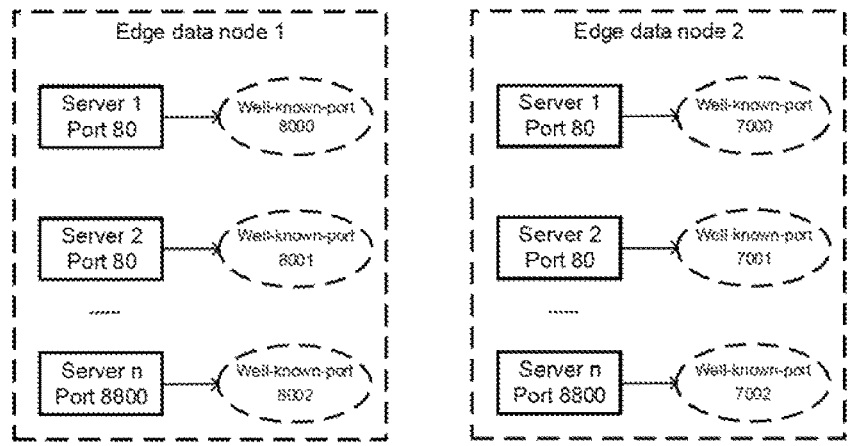
FIG. 6 is a schematic principle diagram of the mapping relationship between the services and the public ports in each node in the network architecture of FIG. 2.

In addition, each node can maintain a mapping relationship between a container corresponding to a service and the public port. That is, containers corresponding to servers in nodes are in one-to-one correspondence to the public ports. The mapping relationship between the container corresponding to the service in the node and the public port may be configured by the management center side, or may be configured by the cluster management module on the node side. Since the cluster management modules in different nodes are not related to each other, the port mapping relationships maintained in the nodes are independent. As shown in FIG. 6, each server corresponds to a container, and the container can only be used by the server in the cluster. Specifically, the port to which the container is mapped is called a public port. In this way, different applications (also called services) may use the same port. For example, both server 1 and server 2 in FIG. 6 are configured to call the port 80 in the container, but it may be found from the port mapping relationship that the server 1 uses port 8000 and the server 2 uses port 8001 when they are mapped to a specific public port. Moreover, when the container inside the server is migrated, for example, from one server to another server, the change in the IP of the container will be maintained inside the server, and the mapped public port will not change. Therefore, the upper layer does not need to care about the migration of the container. Wherein, the mapping relationship among the application, the container, and the public port may be stored in the database of the management center. For example, for the TCP service, the mapping relationship between the virtual IP address and port information and the public port may be saved.

Running module: configured to respond to a service request for computing an edge initiated by a user by running different containers.

Database cache module: the edge data node accesses the database of the central cluster (that is, the database of the management center mentioned above), and then queries the database of the central cluster in the case of no cache hit.

Virtual server cluster module: configured to provide high reliability for service request processing.

Service request processing module (equivalent to the second module in embodiment 2): configured to receive a service request, and route, according to the virtual IP address and port information in the service request, the service request to one or more containers corresponding to the service, to be processed by the containers. That is, based on the mapping relationship between the virtual IP address and port information of the service and the public port, a request for computing an edge is routed to different containers of the edge data node according to the virtual IP address and port information used by the user who initiates the service request for computing an edge.

The practical application of the network architecture for computing an edge will be described below.

Figure 7:
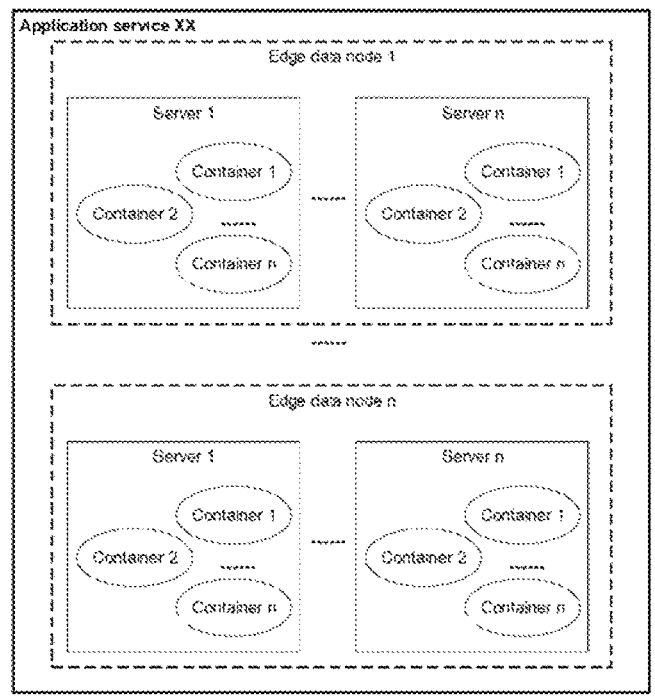
FIG. 7 is a schematic principle diagram of the deployment of each service in the network architecture of FIG. 2.
Figure 8:
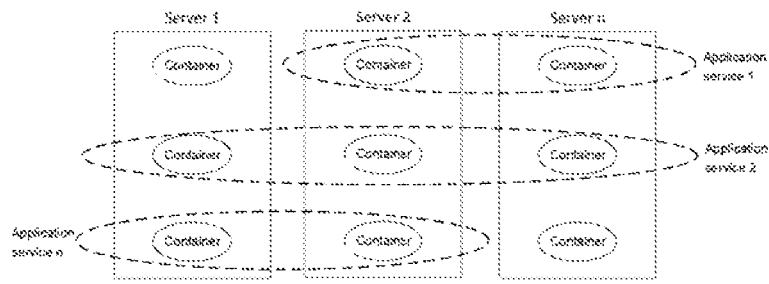
FIG. 8 is a schematic principle diagram of replicas of various services on different edge data nodes in the network architecture of FIG. 2.

First, based on the network architecture above, it may be known that the service requested by the user may be provided by servers deployed on multiple nodes, and each server is a collection of a set of containers. The principle is shown in FIG. 7. Wherein, the number of containers in the same server is called the number of replicas of the server. A specified number of replicas of containers must be run in the server, and distributed on different servers, as shown in FIG. 8. In this way, when a user initiates a service request to an edge data node, the servers may send the request to different containers for corresponding processing in accordance with the load balancing mechanism. This process is transparent to the user, Therefore, for the user, only the servers may be seen.

Specifically, the edge data node listens to the service request initiated by the user through the public port, and then the cluster management module routes the request to one or more containers corresponding to the service through the load balancing processing of the cluster. Generally, the request is routed to a container deployed on a server with light load.

Based on the network architecture for computing an edge, the user may request the creation of various types of services, such as TCP service and UDP service.

This embodiment provides a method for computing a network edge, comprising:

receiving, by an edge data node, a service request, querying, according to the virtual IP address and port information in the service request, a mapping relationship among public ports, virtual IP address, and port information corresponding to the service of the edge data node, to search for a public port corresponding to the virtual IP address and port information in the service request, and sending the service request to the public port located; and after receiving the service request at the public port of any server in the edge data node, routing, according to a cluster load balancing mechanism, the service request to one of the containers corresponding to the service, to be processed by the container.

Wherein, before the client initiates a service request to the edge node, it may send the original service request to the service provider, and the service provider returns the virtual IP address and port information. Or, the service provider issues the virtual IP address and port information to the client in advance, and the client obtains the virtual IP address and port locally.

Wherein, the process in which the edge data node receives a service request initiated by the user may be: the user initiates a service request to the management center (it may be a network element that implements the scheduling or routing function for computing an edge, for example, applied to the device of the service provider) using the virtual IP address and port information stored, the edge data node determines the edge data node corresponding to the virtual IP address and port information according to the virtual IP address and port information of the service request initiated by the user, and sends the IP address of the edge data node determined to the user. The user initiates a service request to the edge data node, wherein the service request comprises virtual IP address and port information.

When the computing the network edge of the service is implemented based on the method, the corresponding service may be created in the network edge data node in advance. That is, the edge data node receives a service create request sent by the management center. The service create request may comprise container configuration information of the service to be created. In this case, the edge data node creates a container corresponding to the service on the server in the edge data node, according to the container configuration information contained in the service create request received. Then, the edge data node may provide services to the user. Here, the container configuration information may comprise any one or more of the number of containers, the container-use resource information, or the container image address.

Based on the method, in another optional embodiment, the edge data node creates a container corresponding to the service on the server in the edge data node according to the container configuration information. Reference may be made to:

the edge data node may select, according to the container-use resource information, a plurality of servers whose available resources meet the container-use resource information; and the edge data node creates containers corresponding to the service on the servers selected according to the container image address, wherein one or more containers may be created on one server, so the number of the servers selected may be less than or equal to the number of containers.

In another optional embodiment, when the edge data node creates a container corresponding to the service on the server in the edge data node according to the container configuration information, the container may be created in the following way.

The edge data node may create a container corresponding to the service on the server in the edge data node by the pre-configured virtual IP address and port information of the service and the public port corresponding to the virtual IP address and port information. In this embodiment, the pre-configured virtual IP address and port information of the service and the public port corresponding to the virtual IP address and port information may be pre-configured by the management center and issued to the edge data node, or may be autonomously configured by the edge data node, or may be configured by the service provider through an interface. It is not specifically limited in the present application. The virtual IP address and port information corresponds, as a whole, to the public port.

This embodiment provides another method for computing a network edge, comprising:

by a management center, receiving a service deploy request, and obtaining configuration information of the service to be created according to the service deploy request, the configuration information of the service for computing an edge comprising at least the specified edge data node information and the container configuration information of the service to be created; and by the management center, sending a service create request to a specified edge data node according to the configuration information of the service, the service create request containing container configuration information of the container deployed on the specified edge data node.

Wherein, the container configuration information of the container has been introduced above, and will not be repeated here.

Based on the method, in an optional embodiment, the method may further comprise:

saving, by the management center, the configuration information of the service after the service is created on the edge data node.

Based on the method, in an optional embodiment, when the management center sends a service create request to the specified edge data node, it may further configure the virtual IP address and port information of the service for the edge data node, as well as the public port corresponding to the virtual IP address and port information of the service, and may issue the virtual IP address and port information of the service and the corresponding public port to the edge data node.

Based on the above method, in another optional embodiment, the management center may further return the virtual IP address and port information of the service to be created to the initiator of the service deploy request, for example the service provider. The virtual IP address and port information of the service is used to indicate that the user using the service may use the virtual IP address and port information to initiate a service request.

Based on the method, in another optional embodiment, the management center may further receive a service request containing the virtual IP address and port information sent by the user. The management center determines edge data node information corresponding to the virtual IP address and port information contained in the service request, and returns the edge data node information determined to the user, wherein the edge data node information comprises at least the IP address of the edge data node. In this embodiment, the edge data node information determined by the management center may be the IP address of the edge data node whose geographic location and/or logical location is closest to the user.

In the present application, the edge data node whose logical location is closest to the initiator of the service request may comprise the edge data node of the same operator as the initiator of the service request and/or the edge data node with the minimum of data transmission delay. For example, the operator to which the initiator of the service request belongs may be determined, and an edge data node belonging to the operator may be selected as the edge data node whose logical location is closest to the initiator of the service request. It is also possible to determine the edge data node with the minimum of data transmission delay as the edge data node whose logical location is closest to the initiator of the service request. The edge data node with the minimum of data transmission delay among the edge data nodes under the operator to which the initiator of the service request belongs may be determined as the edge data node whose logical location is closest to the initiator of the service request. The data transmission delay comprises node processing delay, queuing delay, sending delay, propagation delay, etc.

The following takes actual applications as an example to introduce the process of creating a service by an edge data node, initiating a service request to an edge data node by a user, and accessing the service by the edge data node.

An embodiment of the present application provides a process for creating a service in an edge computing network. The process mainly comprises:

Step S1: The user (here, service provider, which may be referred to as an administrator user) sends a deploy application request to an application program interface server of a management center;

wherein the deploy application request may comprise the type information of the service requested to be deployed and the location information (for example node information) of the service deployed.

Step S2: The application program interface server queries the database of the management center to search for the available virtual IP address and port information and the available public port on the node requesting the deployment service, and allocates an available virtual IP address and port information and an available public port on the edge data node for the service to be deployed, for example, a virtual IP address and port 9000 and a public port 7000 are allocated on node 1.

The available virtual IP address and port information may be an idle virtual IP address and idle port, or a virtual IP address and port not occupied by other users or services. The available public port may be an idle port, or a port not occupied by other services.

Step S3: The application program interface server sends a create request to a cluster management module of the edge data node 1, and the cluster management module is responsible for the specific creation.

wherein, the create request sent by the application program interface server contains the virtual IP address and port information allocated for the service, as well as the corresponding public port information, and container configuration information.

In the present application, the container information may comprise any one or more of the number of containers (which may be referred to as the number of replicas of the server), the container-use resource information, or the container image address.

Step S4: The cluster management module selects several servers according to the restrictions of the CPU, memory, etc., and in accordance with the cluster load balancing mechanism, and creates containers for running the service on the servers selected.

wherein, the cluster management module selects a plurality of servers according to the number of containers in the container configuration information. That is, the number of the servers selected may be less than or equal to the number of containers. Moreover, for the selection of servers, the servers that can meet the container-use resource information are selected based on the container-use resource information in the container configuration information. After selecting the servers, when creating the containers, the creation operation may be implemented according to the container image address in the container configuration information.

Step S5: The application program interface server adds the mapping relationship between the virtual IP address and port information corresponding to the service and the public port to a service request processing module of the edge data node 1, allows the service request processing module to listen to the public port corresponding to the virtual IP address and port information, and forwards the request to the public port.

Step S6: The application program interface server records the mapping relationship between the virtual IP address and port information corresponding to the service and the public port in the database.

Step S7: The application program interface server returns the virtual IP address and port information corresponding to the service to the service provider, and the service provider issues it to the client. The client needs to record the virtual IP address and port information, to subsequently access the service directly by the virtual IP address and port information. Or, based on the user's original access request (for example, a domain name access request), the service provider returns the corresponding virtual IP address and port information to the user.

In the method steps, when the available virtual IP address and port information of the edge data node and the corresponding available public port are allocated to the service to be created, they are allocated by an application program interface server on the management center side. However, it is just exemplary. In practical applications, the reliable virtual IP addresses and port information and the corresponding available public port may be allocated to the service by the edge data node side. After the corresponding virtual IP addresses and port information and the corresponding public port are allocated to the service by the edge data node side, the virtual IP addresses and port information corresponding to the service and the corresponding public port may be reported to the management center.

Figure 9:
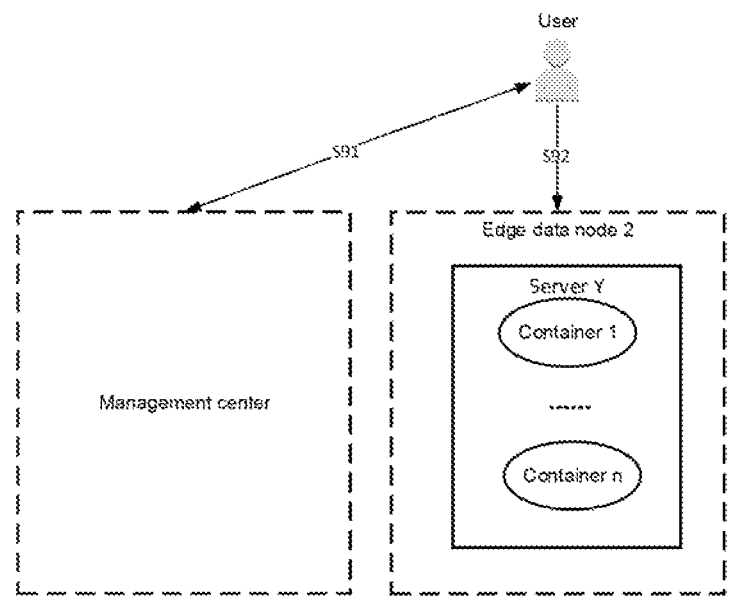
FIG. 9 is a flowchart of a method for a user to initiate a service request to an edge data node in the network architecture of FIG. 2.

After creating the service as described above, the user may initiate a service request to the edge data node. FIG. 9 is a schematic flowchart of a method for initiating a service request according to an exemplary embodiment. As may be know from FIG. 9, the method mainly comprises:

Step S91: The user sends a service request carrying virtual IP address and port information to the management center. After receiving the service request, the management center returns the IP of an edge data node to the user according to the local scheduling algorithm.

In this step, the IP of the edge data node returned by the management center to the user may be the virtual IP address and port information according to the service request initiated by the user. The edge data node corresponding to the virtual IP address and port information is determined according to the load balancing mechanism. The IP of the determined edge data node is fed back to the user.

Wherein, there may be one or more edge data nodes corresponding to the virtual IP address and port information. The edge data node corresponding to the virtual IP address and port information comprises the edge data node whose geographic location and/or logical location is closest to the initiator of the service request. Specifically, the process of determining the edge data node corresponding to the virtual IP address and port information has been described above, and will not be repeated here.

Step S92: The user initiates a service request to the edge data node according to the IP of the edge data node received. The service request contains virtual IP address and port information. The container-group server in the edge data node that receives the service request provides corresponding services to the user.

It may be known from the method above that the management center provides the service requested by the user, and may save the corresponding relationship information between each edge data node and the virtual IP address and port information, and the public port.

Figure 10:
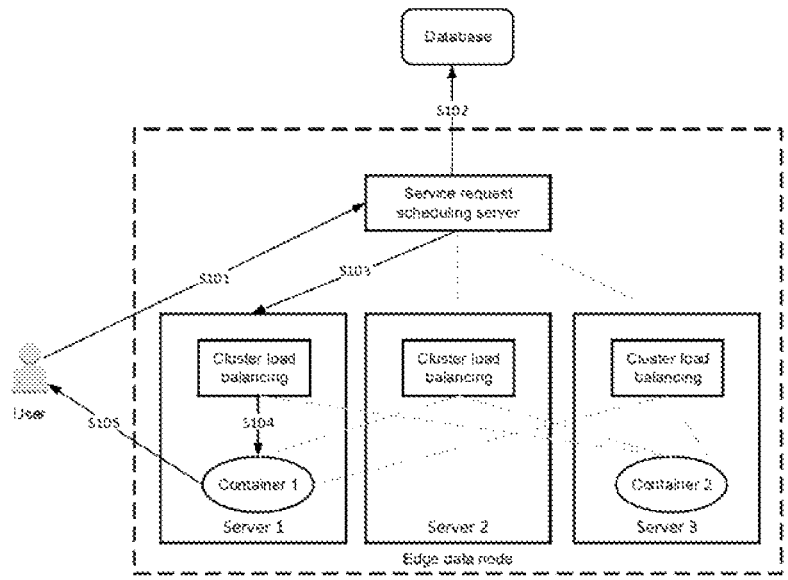
FIG. 10 is a flowchart of a method for implementing service access by an edge data node in the network architecture of FIG. 2.

FIG. 10 is a schematic flowchart of a method of computing a network edge in this embodiment. The method mainly comprises:

Step S101: The user uses the stored virtual IP address and port information to directly access (that is, send a service request) the service request scheduling server of the edge data node, wherein the service request scheduling server may support 4-layer load balancing processing.

Step S102: The service request scheduling server searches the corresponding public port according to the virtual IP address and port information requested by the user, to check whether the request is legal. If the request is a legal request, the process proceeds to the step S103. If the request is an illegal request, the user is informed of invalid operation or illegal operation. This process ends.

This operation step may be omitted, so there is no need to access the database of the management center.

Step S103: The service request scheduling server sends the service request to the public port of the node (that is, the public port found).

Step S104: The cluster routes the service request to a certain container in a specified server according to the load balancing mechanism.

In this step, the cluster may route the service request to an idle container or any non-idle container corresponding to the service according to the load balancing mechanism.

Step S105: The container processes the user's request and returns the result to the user.

An embodiment of the present application further provides a computer-readable storage medium having a computer program stored therein, when executed, the computer program implements steps of the method for computing a network edge described above. The specific implementation involved in the execution of the computer program has been described in detail in the embodiment of the method, and will not be repeated here.

Figure 11:
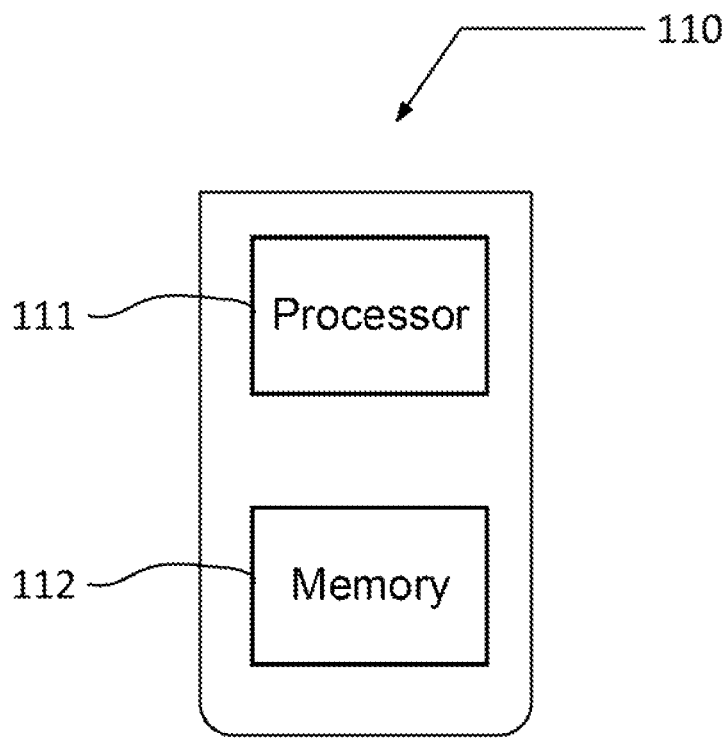
FIG. 11 is a block diagram of a computer device for computing a network edge according to an exemplary embodiment.

FIG. 11 is a block diagram of a computer device 110 for computing a network edge according to an exemplary embodiment. For example, the computer device 110 may be provided as a server. Referring to FIG. 11, the computer device 110 comprises a processor 111, and one or more processors may be provided according to actual needs. The computer device 110 further comprises a memory 112 configured to store instructions executable by the processor 111, for example application programs. One or more memories may be provided according to actual needs. There may be one or more application programs stored in the memory. The processor 111 is configured to execute instructions to perform the method for computing a network edge described above.

It may be understood by those skilled in the art that the embodiments of the present application may be provided as methods, apparatuses (devices), or computer program products. Therefore, the present application may be in the form of an only hardware embodiment, an only software embodiment, or an embodiment combining software and hardware. Moreover, the present application may be in the form of a computer program product implemented on one or more computer-usable storage media containing computer-usable program codes. The computer storage media comprise volatile and nonvolatile, removable and non-removable media implemented in any method or technology for storing information (for example computer-readable instructions, data structures, program modules, or other data), including but not limited to RAMs, ROMs, EEPROMs, flash memories or other memories, CD-ROMs, digital versatile disks (DVD) or other optical disk storages, magnetic cartridges, magnetic tapes, magnetic disk storages or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

The present application has been described with reference to flowcharts and/or block diagrams of the methods, apparatuses (devices) and computer program products according to embodiments of the present disclosure. It should be understood that each flow and/or block in the flowchart and/or block diagram and the combination of flows and/or blocks in the flowchart and/or block diagram may be implemented by computer program instructions. These computer program instructions may be provided to the processors of general-purpose computers, special-purpose computers, embedded processors, or other programmable data processing devices to produce a machine, so that the instructions executed by the processors of the computers or other programmable data processing devices produce an apparatus that realizes the functions specified in one or more flows in the flowchart and/or one or more blocks in the block diagram.

These computer program instructions may be stored in computer-readable memories that can direct computers or other programmable data processing devices to work in a specific manner, so that the instructions stored in the computer-readable memories produce an article of manufacture including the instruction apparatus. The instruction apparatus implements the functions specified in one or more flows in the flowchart and/or one or more blocks in the block diagram.

These computer program instructions may be loaded on computers or other programmable data processing devices, so that a series of operation steps are executed on the computers or other programmable devices to produce computer-implemented processing. Thus, the instructions executed on the computers or other programmable devices provide steps for implementing the functions specified in one or more flows in the flowchart and/or one or more blocks in the block diagram.

Herein, terms "comprise," "include" and variants thereof are intended to cover non-exclusive inclusion, so that an article or a device including a series of elements not only includes these elements, but also includes other elements not explicitly listed, or further includes inherent elements of the article or the device. Without further limitation, an element as defined by a statement "including a . . . " is not exclusive of additional identical elements in the article or the device of the element.

Although the preferred embodiments of the present application have been described, those skilled in the art can make additional changes and modifications to these embodiments once they learn the basic creative concept. Therefore, the appended claims are intended to be interpreted as comprising the preferred embodiments and all changes and modifications falling into the scope of the present application.

Apparently, those skilled in the art can make various modifications and variations to the present application without departing from the spirit and scope of the present application. In this way, if these modifications and variations of the present application fall into the scope of the claims of the present application and their equivalents, the present application is intended to encompass these modifications and variations.

INDUSTRIAL APPLICABILITY

The present application provides a method and an apparatus for computing a network edge. The edge data node that performs the operations may be one or more edge data nodes in an edge data node cluster corresponding to the virtual IP address and port information. Or, the edge data node may be one or more edge data nodes in an edge data node cluster selected based on a load balancing strategy and corresponding to the virtual IP address and port information. No intervention of the service provider is required, and the user can directly initiate a service request to the edge data node by using the virtual IP address and port information obtained in advance to realize the computing an edge of the service.

The invention claimed is:

1. A network edge computing method comprising:
receiving, by an edge data node, a service request;
routing, by the edge data node and according to a virtual IP address and port information in the service request, the service request to one or more containers corresponding to a service, to be processed by the one or more containers; and
transmitting the virtual IP address and the port information in advance to an initiator of the service request or a third party trusted by the initiator.

2. The method according to claim 1, wherein routing the service request to the one or more containers includes:
querying a mapping relationship among public ports, virtual IP addresses, and port information corresponding to services of the edge data node, to search for a public port corresponding to the virtual IP address and the port information in the service request, and sending the service request to the public port; and
after receiving the service request, routing, by the public port and according to a load balancing mechanism, the service request to the one or more containers corresponding to the service.

3. The method according to claim 1, wherein:
the edge data node belongs to an edge data node cluster corresponding to the virtual IP address and the port information; or
the edge data node belongs to an edge data node cluster selected based on a load balancing strategy and corresponding to the virtual IP address and the port information.

4. The method according to claim 1, wherein the service request includes at least one of a TCP request or a UDP request.

5. The method according to claim 4, further comprising:
before receiving the service request:
receiving, by the edge data node, a service create request, the service create request including container configuration information of the service to be created; and
creating, by the edge data node and according to the container configuration information, containers corresponding to the service on servers in the edge data node.

6. The method according to claim 5, wherein the container configuration information includes at least one of:
a number of containers, container-use resource information, or a container image address.

7. The method according to claim 6, wherein creating the containers includes:
selecting, by the edge data node and according to the container-use resource information, a plurality of servers having available resources meeting the container-use resource information; and
creating the containers corresponding to the service according to the container image address on the servers selected.

8. The method according to claim 5, further comprising:
configuring, by the edge data node, a corresponding public port for each of the containers using public ports pre-configured and corresponding to the virtual IP address and the port information of the service;
wherein the virtual IP address and the port information of the service pre-configured and the public port corresponding to the virtual IP address and the port information are issued by a management center to the edge data node, or autonomously configured by the edge data node.

9. A computer-readable storage medium storing a computer program that, when executed, implements a network edge computing method comprising:
receiving, by an edge data node, a service request;
routing, by the edge data node and according to a virtual IP address and port information in the service request, the service request to one or more containers corresponding to a service, to be processed by the one or more containers; and
transmitting the virtual IP address and the port information in advance to an initiator of the service request or a third party trusted by the initiator.

10. A computer device comprising:
a processor; and
a memory storing a computer program that, when executed by the processor, causes the processor to:
receive a service request;
route, according to a virtual IP address and port information in the service request, the service request to one or more containers corresponding to a service, to be processed by the one or more containers; and
transmit the virtual IP address and the port information in advance to an initiator of the service request or a third party trusted by the initiator.

11. The computer device according to claim 10, wherein the computer program further causes the processor to:
query a mapping relationship among public ports, virtual IP addresses, and port information corresponding to services of the edge data node, to search for a public port corresponding to the virtual IP address and the port information in the service request, and send the service request to the public port; and
control the public port to, after receiving the service request and according to a load balancing mechanism, route the service request to the one or more containers corresponding to the service.

12. The computer device according to claim 10, wherein:
the edge data node belongs to an edge data node cluster corresponding to the virtual IP address and the port information; or
the edge data node belongs to an edge data node cluster selected based on a load balancing strategy and corresponding to the virtual IP address and the port information.

13. The computer device according to claim 10, wherein the service request includes at least one of a TCP request or a UDP request.

14. The computer device according to claim 13, wherein the computer program further causes the processor to, before receiving the service request:
receive, by the edge data node, a service create request, the service create request including container configuration information of the service to be created; and
create, by the edge data node and according to the container configuration information, containers corresponding to the service on servers in the edge data node.

15. The computer device according to claim 14, wherein the container configuration information includes at least one of:
a number of containers, container-use resource information, or a container image address.

16. The computer device according to claim 15, wherein the computer program further causes the processor to:
select, and according to the container-use resource information, a plurality of servers having available resources meeting the container-use resource information; and
create the containers corresponding to the service according to the container image address on the servers selected.

17. The computer device according to claim 14, wherein:
the computer program further causes the processor to configure a corresponding public port for each of the containers using public ports pre-configured and corresponding to the virtual IP address and the port information of the service; and
the virtual IP address and the port information of the service pre-configured and the public port corresponding to the virtual IP address and the port information are issued by a management center to the edge data node, or autonomously configured by the edge data node.

* * * * *